COMPOUND OPTICAL FILTER PROVIDING A SHARP CUT-OFF

Original Filed Oct. 23, 1961

ROBERT W. ALLINGTON
INVENTOR.

BY

RICHARDS & CIFELLI
ATTORNEYS

United States Patent Office

Re. 26,638
Reissued July 29, 1969

26,638

COMPOUND OPTICAL FILTER PROVIDING A SHARP CUT-OFF

Robert W. Allington, Lincoln, Nebr., assignor to Instrumentation Specialties Company, Lincoln, Nebr., a corporation of Nebraska Original No. 3,243,595, dated Mar. 29, 1966, Ser. No. 267,210, Mar. 22, 1963, which is a division of application Ser. No. 147,015, Oct. 23, 1961, now Patent No. 3,151,639, dated Oct. 6, 1964. Application for reissue Jan. 5, 1968, Ser. No. 707,343

Int. Cl. G01j *3/34, 3/50*

U.S. Cl. 250—226 7 Claims

Matter enclosed in heavy brackets [ ] appears in the original patent but forms no part of this reissue specification; matter printed in italics indicates the additions made by reissue.

*ABSTRACT OF THE DISCLOSURE*

*Compound optical filters are described for discriminating against all spectral lines of significant intensity other than a predetermined spectral line in a source of spectral light comprising a line spectrum. The filters include a means, such as a red-purple silica element, for cutting off transmittance of substantially all light from a spectral source of a wavelength shorter than the predetermined spectral line, means, such as an element which fluoresces green, for example, when excited primarily by light of a wavelength of the predetermined spectral line, but not substantially in response to light of longer wavelength, and means, such as green glass, which transmits at least part of the fluorescent light, but which absorbs substantially all of the light in the spectral source passed by the first element, whereby substantially all the light passing out of the filter is derived from fluorescence produced by light of the wavelength of a single predetermined spectral line of the spectral source.*

Figure 1:
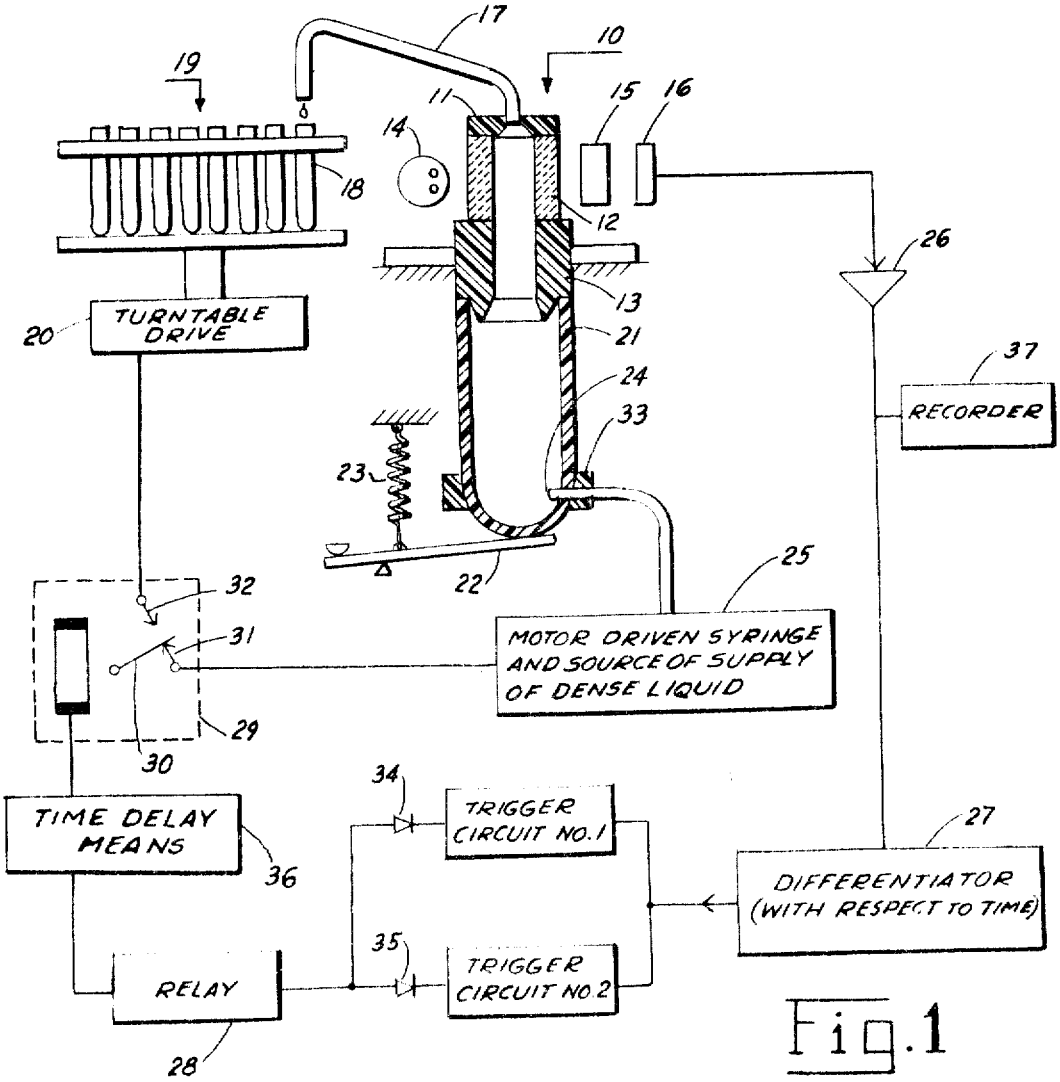

This invention relates to an optical filter and more particularly to a compound filter providing a sharp cut-off of light rays having a wavelength other than a spectral line of interest.

The present application is a division of my copending application Serial. No. 147,015, filed October 23, 1961, now Patent No. 3,151,639, and entitled, "Apparatus for Making Chemical Separations." Such prior-filed application discloses apparatus for the fractionation of chemical mixtures on the basis of optical density. Briefly, the apparatus comprises an optical cell associated with a density-gradient column and means for causing the liquid to flow out of the column and through the optical cell at a predetermined rate. A light beam is directed through the optical cell [and strikes] *to produce light striking* a photoelectric cell, the output of which varies in correspondence with the light absorption of the particular liquid passing through the optical cell. The output variations of the photoelectric cell are utilized to effect a continuous measurement of the optical density of the flowing liquid and/or to direct the discharged liquid into suitable collecting tubes.

The light beam transmitted through the optical cell is monochromatic and the light rays striking the photoelectric cell should [have] *be derived from light having* a predetermined bandwidth as narrow as possible in order to provide apparatus having high accuracy, sensitivity and resolution. The present application is directed to a novel, compound light filter for this purpose. Although the filter is particularly adapted for utilization in chemical fractionating, it is not limited to such specific use.

An object of this invention is the provision of an optical filter [having] *emitting light derived from* a very narrow light [transmission] band.

An object of this invention is the provision of an optical filter made up of a plurality of light-transmitting elements one of which fluoresces when excited by light rays of predetermined wavelength.

An object of this invention is the provision of a light filter formed of three elements arranged in series, the first element transmitting light rays of predetermined wavelength, the second element fluorescing when excited by light rays of the predetermined wavelength and the third element transmitting *substantially* only light rays corresponding to the color at which the second element fluoresces.

An object of this invention is the provision of a combination light source, light filter and photoelectric cell wherein the light rays striking the photoelectric cell [have] *are derived from light having* a [single] predetermined *very narrow bandwidth* [wavelength], *in some cases the bandwidth being as limited as the narrow, but finite width of a single spectral line.*

These and other objects and advantages of the invention will become apparent from the following description when taken with the accompanying drawings. It will be understood, however, that the drawings are for purposes of illustration and are not to be construed as defining the scope or limits of the invention, reference being had for the latter purpose to the claims appended hereto.

Figure 2:
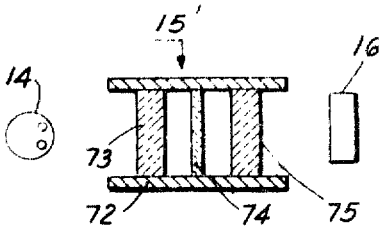

In the drawings wherein like reference [charatcers] *characters* denote like parts in the several views:

FIGURE 1 is a diagrammatic representation showing fractionating apparatus incorporating a light filter made in accordance with this invention; and FIGURE 2 is a longitudinal cross-sectional view showing the arrangement of the elements making up the light filter.

Reference, now, is made to FIGURE 1, wherein there is shown an optical flow cell 10 comprising a cap 11, a window 12 and a bushing member 13. The window is positioned in the path of a light beam emanating from a low pressure mercury lamp 14, which light beam passes [through] *into* a filter 15 *wherein fluorescent light is produced which on passing out of the filter* [and] impinges upon a photoelectric cell 16.

A delivery tube 17 has one end secured to the cap 11 and the other end spaced from a collecting tube 18. A plurality of such collecting tubes is carried by a conventional fraction collector comprising a turntable 19 rotatable by a turntable drive 20 provided with a suitable indexing mechanism whereby actuation of the drive rotates the turntable to bring a succeeding collecting tube under the discharge end of the delivery tube. The tube 21 contains the density-gradient column which is to be fractionated, said tube being a plastic tube of relatively thin wall and being supported in operative position relative to the optical cell by suitable means represented by the pivotally-mounted lever 22 and the spring 23. The tube wall is punctured by a needle 24 which is connected, by a flexible hose, to a motor-driven syringe and source of supply of a dense liquid generally identified by the numeral 25. Such dense liquid has a specific gravity exceeding that of the densest liquid contained in the density-gradient column. Operation of the syringe forces the dense liquid into the tube 21, thereby floating the contained liquid upwardly through the optical cell 10 and the delivery tube 17.

As the liquid passes through the optical cell, the intensity of the light striking the photoelectric cell varies in correspondence with the light-absorbing character of the liquid actually passing through the light beam. Corresponding variations in the output of the photoelectric cell are amplified by a suitable amplifier 26, which operates the stylus of a recorder 37, thereby providing a continuous measurement of the optical density of the liquid as it passes through the light beam. The amplifier also controls a differentiator 27 for the proper actuation of one or the other trigger circuits thereby to effect energization and deenergization of the relays 28 and 29. When the relay 29 is deenergized, the normally-closed relay contacts 30, 31 complete an electrical circuit to the motor-driven syringe thereby injecting the dense liquid into the bottom of the density-gradient column. On the other hand, when the relay 29 is energized, power is removed from the syringe-drive motor and applied to the motor of the turntable drive 20 through closure of the relay contacts [31] *30,* 32. The turntable 19 now is rotated to bring another collecting tube into position to receive liquid from the discharge tube 17. A suitable time delay means 36 is interposed between the relays 28 and 29 to delay the operation of the turntable drive for a period equal to the liquid transfer time between the optical cell and the collecting tube.

The filter 15 is designed to restrict the light rays striking the photoelectric cell to those *derived from light* having a predetermined very narrow bandwidth.

Reference, now, is made to FIGURE 2, which illustrates the general construction of the filter. Such filter, here identified by the numeral 15', is made up of three elements arranged in series and supported in relatively fixed positions in a suitable housing 72. The leading, or front, element 73 is made of a material which transmits light of a predetermined wavelength. The center element 74 is made of a material which fluoresces under the influence of the light rays falling in the transmission band of the elements 73, and the back element 75 is made of a material which transmits *substantially* only light of the wavelength emitted by the fluorescence of the element 74. It is desirable, although not necessary, that the front element 73 have a high light-absorbence factor at that wavelength corresponding to the transmission wavelength of the rear element 75. It is also desirable that the photoelectric cell 16 be responsive *substantially* only to light having a wavelength equal to that at which the center element 74 fluoresces.

Such compound filter, when used in conjunction with a spectral light source, makes it possible to provide [a] light *derived from a* beam of much narrower, effective wavelength than can be obtained by conventional absorption or interference filters. The described filter is particularly useful in applications involving the measurement of light transmittance or reflectance of specimens, since sensitivity and accuracy of the measurements is directly related to the narrowness of the bandwidth of the effective light rays.

The present filter provides light rays of very narrow bandwidth. The element 73 can be made of a material selected to cut off wavelengths shorter than the spectral line of interest supplied by the light source 14, and the element 74 can be made of material selected to have a cut-off wavelength for excitation of fluorescence at a slightly longer wavelength than the spectral line of interest. As a specific illustration, the following arrangement has been found to provide an extremely narrow, effective bandwidth, with a stray light factor of less than one thousandths of the magnitude of the desired wavelength.

The light source 14 is a low pressure, mercury vapor lamp which exhibits, along with other wavelengths, light of 254 millimicrons wavelength. The element 73 is a red-purple silica, which transmits this wavelength and strongly absorbs green light. The element 74 is chosen to fluoresce green [whe] *when* excited by wavelengths shorter than 280 millimicrons. The element 75 is green colored glass and the photoelectric cell is green-sensitive. Such specific arrangement will respond *substantially* only to light in the range of 240–280 millimicrons, 240 being the cut-off point of the element 73 and 280 being the cut-off point of the element 74. Within this region, the exciting lamp has only one significant wavelength, namely 254 millimicrons. The entire system, as a whole, responds *substantially* only to a wavelength of 254 millimicrons. Contrastingly, if an interference or absorption filter were used instead, *substantial* stray light would exist, especially of a wavelength of 313 millimicrons. *The filters of the present invention, however, remove substantially all light from the spectral source permitting passage of only practically acceptable amounts of stray light.*

Having now described the invention, those skilled in this art will be able to make various changes and modifications in the filter construction, to adapt same for specific uses, without departing from the scope and spirit of the invention as recited in the following claims.

I claim:

1. A light filter adapted to discriminate against all spectral lines of *significant intensity* other than a predetermined spectral line in a source of spectral light comprising a line spectrum, said filter comprising:

(a) means cutting off transmittance of substantially all light emitted from a spectral source of the same and shorter wavelength than that of the spectral line next adjacent to but of shorter wavelength than said predetermined spectral line;

(b) means which fluoresces when *primarily* excited by light of the wavelength of the predetermined spectral line [to produce an excitation spectrum containing substantially no] *and which has no substantial fluorescent response to* light of the same and longer wavelength than that of the spectral line next adjacent to but of longer wavelength than said predetermined spectral line; and (c) means for transmitting at least part of the light produced by the fluorescence of the means of part (b) and for absorbing substantially all light from a spectral source transmitted by the means of part (a) whereby substantially all of the light passing out of said filter is derived from fluorescence produced by light of the wavelength of a single predetermined spectral line in a spectral source.

2. A light filter according to claim 1, wherein the means of part (a) absorbs light having a wavelength corresponding to that of the light produced by fluorescence of the means of part (b).

3. A light filter according to claim 1, wherein the means of part (a) is a red-purple silica, the means of part (b) is a material which fluoresces green, and the means of part (c) is green-colored glass.

4. A light filter according to claim 1, in combination with a light source adjacent to the means of part (a) emitting light containing a predetermined spectral line, and a photoelectric cell adjacent to the means of part (c) adapted to respond to light of the wavelength produced by fluorescence of the means of part (b).

5. A combination according to claim 4, wherein the means of part (c) is adapted to absorb substantially all light transmitted by the means of part (a) to which said photoelectric cell is adapted to respond.

6. A light filter according to claim 3, in combination with a low pressure, mercury vapor light source positioned to transmit light to the means of part (a), and a green-sensitive photoelectric cell positioned to receive light transmitted by the means of part (c).

7. The combination comprising:

(a) a low pressure, mercury vapor lamp emitting light of 254 millimicrons wavelength;

(b) a light-transmitting means of red-purple silica receiving light from said lamp;

(c) a light permeable means proximate to the means of part (b) which fluoresces green when excited by light of a wavelength shorter than 280 millimicrons;

(d) a light-transmitting means of green colored glass positioned proximate to the means of part (c); and (e) a green-sensitive photoelectric cell positioned to receive light transmitted by the means of part (d).

References Cited

The following references, cited by the Examiner, are of record in the patented file of this patent or the original patent.

UNITED STATES PATENTS

| | | | |
|---|---|---|---|
| 2,656,845 | 10/1953 | Lindsay | 250—226 X |
| 2,739,245 | 3/1956 | Reed | 250—226 X |
| 3,056,032 | 9/1962 | Cannon | 250—226 X |
| 3,105,908 | 10/1963 | Burkhardt et al. | 250—219 |
| 3,128,385 | 4/1964 | Scharf et al. | 250—83.3 |

WALTER STOLWEIN, Primary Examiner

U.S. Cl. X.R.

250—71.5, 83.3; 350—316